Figure 1:
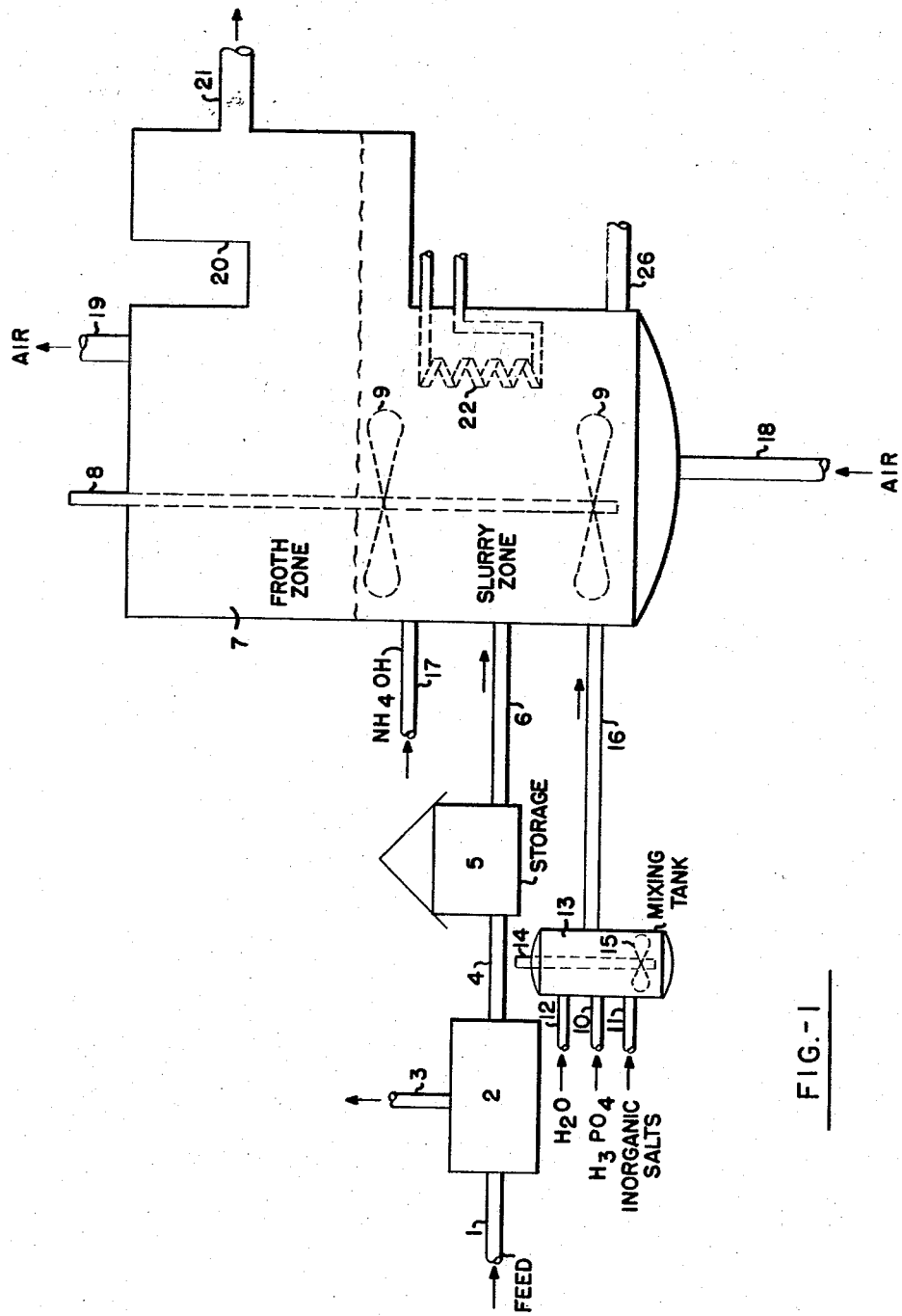

Nov. 28, 1967   M. B. PERKINS ETAL   3,355,296
PROCESS OF CULTIVATING HIGH PROTEIN CONTAINING
MICRO-ORGANISMS ON HYDROCARBON FEED MIXTURES
Filed May 6, 1964                2 Sheets-Sheet 1

Michael B. Perkins
Louis E. Furlong          Inventors

By Joseph P. Burke        Patent Attorney

Michael B. Perkins
Louis E. Furlong  Inventors

United States Patent Office 3,355,296
Patented Nov. 28, 1967

3,355,296
PROCESS OF CULTIVATING HIGH PROTEIN CONTAINING MICRO-ORGANISMS ON HYDROCARBON FEED MIXTURES
Michael B. Perkins, Linden, N.J., and Louis E. Furlong, Madison, Wis., assignors to Esso Research and Engineering Company, a corporation of Delaware
Filed May 6, 1964, Ser. No. 365,391
19 Claims. (Cl. 99—14)

This invention is directed to an improved process for growing microorganisms on inexpensive hydrocarbon feeds and recovering directly an excellent high (70–80) protein food supplement for animals and/or humans. More particularly, in a preferred embodiment this invention is directed to a process for preparing a high protein food which comprises providing an inoculant of aerobic, bacteria cells, water and oxygen; supplying to the inoculant a feed mixture comprised of $C_1$ to $C_{35}$ normal hydrocarbons in an aqueous growth medium containing in its essential components water, a nitrogen compound, a phosphorus compound, and water-soluble inorganic salts of sodium, potassium, magnesium, calcium and manganese, nutrients and an oxygen-containing gas to form a biosynthesis bath; establishing and maintaining in the biosynthesis bath an upper froth zone wherein the weight ratio of froth bacteria to froth hydrocarbons exceeds 1 to 1 and a lower slurry zone; establishing and maintaining in said biosynthesis bath a weight ratio of bacteria cells in the froth to bacteria cells in the slurry in excess of 1.0:1 continuously removing a froth mixture of bacteria cells, aqueous growth medium and unconverted hydrocarbons from said froth zone; separating bacteria cells from the remainder of the froth mixture and drying the separated bacteria cells to obtain directly a high protein food.

The present world shortage of protein, esp., low cost animal proteins, for consumption by animals and humans is well known. In an attempt to alleviate this protein shortage, recently there have been developed several biosynthesis procedures whereby living protein can be provided by the growth of bacteria on various carbon-containing substrate materials especially those which are relatively inexpensive. One of the promising techniques of biosynthesis involves growing various yeast or bacteria on carbohydrate substrates. However, most of these biosyntheses require expensive vitamins and other growth mediums in order to insure the desired bacteria growth.

Another recent and even more promising technique for biologically synthesizing food protein is the culture of microorganisms on petroleum substrates. This latter type of protein synthesis is usually conducted in an aqueous biosynthesis bath containing a hydrocarbon feed media, an inoculant of the bacteria to be grown, and an aqueous growth medium in addition to oxygen and other indispensable nutrients. This type of protein biosynthesis allows the use of hydrocarbon feeds, which are even less expensive than carbohydrates, and does not usually require expensive growth factors such as vitamins, amino acids, etc., to be supplied in order to insure proper bacteria cell growth.

However, one serious drawback to the wide acceptance of this latter biosynthesis technique resides in the fact that it is difficult and very expensive to achieve during biosynthesis sufficiently high concentrations of the bacteria cells produced. The failure to achieve economically satisfactory high concentrations of bacteria cells in the biosynthesis bath leads to high separation and drying costs occasioned by the necessity to centrifuge or otherwise separate the small amounts of bacteria cells from the large amounts of water as well as unconverted hydrocarbons, inorganic salts etc., present in the biosynthesis bath and also of course in the aqueous slurry effluent stream (product stream) thereof.

Due to the low concentration of bacteria cells, e.g. approximately one percent by weight in the aqueous biosynthesis bath, combined with the relatively expensive nature of centrifuging or conducting other suitable separation and drying procedures to concentrate the bacteria cells and remove them from the aqueous media; separation and drying procedures can amount to as much as 60% or higher of the processing costs.

Hence, it will be realized that any substantial improvement in the concentration of bacteria cells prior to separation and drying will effect significant economic savings and reduce the cost of producing high protein foods by bacterial synthesis using hydrocarbon feeds as the relatively inexpensive source of both carbon and hydrogen.

The present invention constitutes a marked improvement in the production of high protein containing foods and food supplements produced from bacteria inoculants grown on petroleum feeds in that it permits the concentration of bacteria cells (prior to centrifugation or other expensive separation and drying procedures) during biosynthesis to an extent of from 3 to 10 times that attained in typical known fermentation procedures prior to any concentration steps. Thus in accordance with this invention it is possible to obtain bacterial cell concentrations of up to and even exceeding 10% by weight during biosynthesis and prior to effecting separation and drying. This constitutes as much as a tenfold or more increase in bacteria cell concentration when compared with the bacteria cell concentrations customarily produced by known biosynthesis procedures.

Moreover, according to this invention, the bacteria cells are concentrated in the same biosynthesis reactor vessel in which the biosynthesis takes place thus effecting further economies in equipment and space. These and other advantages of the present invention will become apparent from the descripiton which follows.

In most biosynthesis procedures wherein bacteria are grown on petroleum substrates, there is produced a small amount of frothing. In the past, such frothing has been regarded as highly disadvantageous because it was thought to interfere with biosynthesis, clog apparatus and require special materials and equipment to prevent or at least minimize frothing. Consequently, prior to this invention foaming was substantially reduced or eliminated by use of antifoaming devices and/or agents which, although they did succeed to minimize foaming, tended to restrict growth of the bacteria cells being produced in the biosynthesis bath.

According to the present invention however, foaming is not minimized or avoided but rather established, maintained and controlled to serve a useful purpose. The process of the present invention employs carefully controlled froth flotation in which the product bacteria cells are withdrawn from the froth zone for concentrating bacteria cells while biosynthesis is still occurring in the lower slurry zone. Moreover, according to this invention the foaming is conducted purposely to selectively maximize the concentration of cells in the froth zone compared to the cell concentration in the slurry portion of the biosynthesis bath. In this regard according to a preferred embodiment of this invention it has been established that *Micrococcus certificans* bacteria cells are naturally surface active and tend to locate in the froth zone of the biosynthesis bath in the form of a stable froth or foam. In accordance with this invention, several important conditions must be established and maintained during biosynthesis in order to effectively utilize froth flotation during biosynthesis to concentrate bacteria cells grown on normal hydrocarbon feeds.

To begin with the biosynthesis bath, itself, must not inhibit frothing. Thus the biosynthesis bath contains a lower slurry zone and an upper froth zone. Thus use of surface active agents which inhibit or prevent frothing is to be avoided in the biosynthesis bath reactor vessel.

Secondly, the weight ratio of bacteria cells in the froth zone of the biosynthesis bath to the bacteria cells in the slurry zone must be greater than 1.0 to 1, usually exceeds 1.5:1 and preferably exceeds 2.0:1, and the weight percent of bacteria cells in the froth mixture removed from the froth zone should exceed the weight percent of hydrocarbons therein. In other words, it is of primary importance to selectively concentrate the bacteria cells in the froth zone while avoiding concentration of hydrocarbons in the froth zone since this is the zone from which the product stream is withdrawn. The hydrocarbon feed component constitutes the source of carbon and hydrogen for bacteria cell growth and multiplication. This feed is usually the most expensive feed going to the biosynthesis bath. It has been discovered that the conversion of hydrocarbons to bacteria is greater in the slurry zone than it is in the froth zone. Hence, the froth zone needs and makes use of less hydrocarbon than the slurry zone. Moreover it is important in a commercial biosynthesis procedure to achieve product concentration to a predominance on a weight basis in the product stream while avoiding concentration of non-product therein in order to reduce feed costs and product separation costs.

Furthermore, it has been discovered that a weight predominance of hydrocarbons over bacteria cells in the froth zone not only constitutes a less efficient utilization of hydrocarbons, but also adversely affects the conversion of hydrocarbons to bacteria in the froth zone resulting in a further lowering of the hydrocarbon to bacteria conversion in the froth zone of the biosynthesis bath.

There should be sufficient hydrocarbon in the froth zone to allow for continued bacteria cell growth and multiplication therein. This is especially important according to a preferred embodiment of this invention wherein the biosynthesis is conducted continuously. For this purpose it is usualy sufficient to establish a froth zone hydrocarbon content approximately equal to that of the slurry zone hydrocarbon content. However, the froth zone hydrocarbon content can be slightly below that of the slurry zone due to the slightly lower utilization of the bacteria occurring in the froth zone. In this regard satisfactory continuous froth flotation biosyntheses have been achieved over extended time periods where the weight ratio of froth hydrocarbons to slurry hydrocarbons is as low as 0.8 to 1. When the ratio of froth hydrocarbons to slurry hydrocarbons is well below 0.8 to 1, there is an adverse affect upon bacteria growth and multiplication in the froth zone of the biosynthesis bath due to lack of sufficient hydrocarbon feed therein. For example, when the ratio of froth hydrocarbons to slurry hydrocarbons is below 0.5 to 1, bacteria growth in the froth zone decreases rapidly. Increasing the concentration of hydrocarbons in the froth zone does not accelerate bacteria growth; nor do high froth hydrocarbon to slurry hydrocarbon ratios appear to hinder growth as long as the froth bacteria exceeds froth hydrocarbons on a weight basis. In fact, it is not unusual for the weight ratio of froth hydrocarbons to slurry hydrocarbons to be as high as 8 to 1, but in such cases the weight ratio of froth bacteria to froth hydrocarbons is usually from 4 to 6 to 1.

For most froth flotation biosynthesis procedures conduced in accordance with this invention, especially continuous froth flotation biosyntheses, the bacteria cell concentration ratio, viz. the weight percent bacteria in the froth in proportion to the weight percent bacteria in the slurry, usually exceeds 1.5 to 1 and preferably exceeds about 2.0 to 1. Ratios exceeding 3 to 1 and 5 to 1 have been achieved, e.g. ranging from 5 to 10:1.

As noted hereinabove the bacteria cell selectivity in the froth zone, viz., the weight ratio of froth bacteria to froth hydrocarbons exceeds 1 to 1. Usually the ratio of froth bacteria to froth hydrocarbons exceeds 10 to 1 and preferably exceeds 20 to 1, e.g. usually ranging from 10 to 20 to 1 and even higher.

It is important to conduct the biosynthesis at a high conversion level in the slurry zone as this has some effect on selective concentration of froth bacteria as compared to froth hydrocarbons in the froth zone of the biosynthesis bath. In order to effect optimum concentration of bacteria cells in the froth zone, the slurry zone conversion of hydrocarbons to bacteria should exceed 90 percent. Usually, it is desirable to maintain the slurry zone conversion of hydrocarbons to bacteria above 95 percent, and preferably ranging from 90 to 99 percent.

In order to insure proper slurry zone conversions of hydrocarbon to bacteria, it is important to feed sufficient oxygen for efficient growth and reproduction. For *Micrococcus cerificans*, the preferred bacteria inoculant, this requires maintaining from 0.5 to 1.5 volumes of air per volume of biosynthesis bath per minute. Of course, less air volumes are required when oxygen enriched air or straight oxygen are used as an oxygen source. The oxygen can be supplied in any form capable of being assimilated readily by the inoculant microorganism, and oxygen containing compounds can be used as long as they do not adversely affect bacteria growth and conversion of hydrocarbon feed to bacteria. Conveniently, however, the oxygen is supplied as an oxygen containing gas, e.g. air, which contains from 19 to 22 weight percent oxygen. Usually it is preferable to employ air; however oxygen enriched air having more than 22 weight percent oxygen, e.g. enriched air having 70+ weight percent oxygen, 90+ weight percent oxygen, or even pure oxygen can be used and have given good results.

Figure 2:
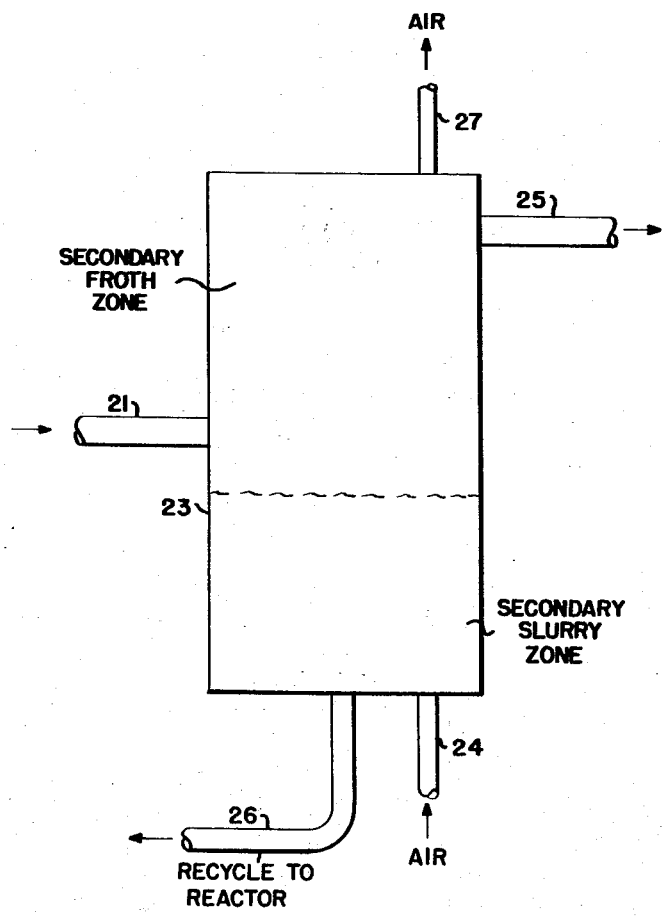

The present invention will be more clearly understood from a consideration of the accompanying drawings describing a preferred apparatus for continuously carrying out the present invention. FIGURE 1 is a cross-sectional view of the froth flotation-biosynthesis reactor system, and FIGURE 2 is a cross-sectional view of a froth concentrator used to concentrate the froth mixture issuing as a product stream from the froth flotation-biosynthesis reactor.

Referring to the drawing, wherein like reference numerals indicate like apparatus parts, raw hydrocarbon feed is fed through line 1 to feed purification unit 2 where non-normal materials and impurities are removed through line 3. This feed purification is preferably conducted on $C_{11}$ to $C_{30}$ hydrocarbons by 5A molecular sieves followed by desorption and then a cleanup of the desorbed normal hydrocarbons with 13X sieves or silica gel to adsorb remaining impurities.

According to a preferred embodiment of this invention a substantial weight percentage, e.g. 70+ percent of the hydrocarbon feed is comprised of normal (straight chain) paraffin hydrocarbons having from 1 to 35 carbon atoms. While the presence of branched, non-aromatic hydrocarbons in amounts up to 30% by weight in the hydrocarbon feed can be tolerated, concentrations in excess of 10 wt. percent of non-normal, non-aromatic hydrocarbons are usually avoided since the bacteria cells employed herein are selective preferentially to normal hydrocarbons, especially n-paraffins. Therefore the use of branched paraffins is preferably avoided. The purified normal hydrocarbons usually contain 90+ weight percent of $C_1$ to $C_{35}$ normal paraffins and up to 10 wt. percent normal olefins. The purified hydrocarbon feed is passed through line 4 to hydrocarbon storage unit 5. These normal hydrocarbons are then supplied through line 6 to froth flotation-biosynthesis reactor 7 containing the bacteria inoculant biosynthesis bath which is stirred by stirrers 9 mounted on common shaft 8. Phosphoric acid is supplied through line 10; inorganic salts are supplied through line 11 and water is supplied through line 12 to mixing tank 13 equipped with a stirrer 15 mounted on shaft 14. The mixed salt solution is supplied through line 16 to reactor 7. Ammonium hydroxide is supplied to the reactor through delivery line 17.

Air or oxygen enriched air is supplied to the reactor through delivery line 18. Effluent gases containing unutilized $O_2$, $N_2$, $CO_2$ and water vapor are vented to the atmosphere from the reactor through outlet line 19. The froth flotation biosynthesis reactor preferably contains a froth flotation removal section 20 which, due to the outward and upward flow of exhaust gases, allows the froth from the upper froth zone to be collected prior to removal through froth removal line 21. A cooling coil 22 or other suitable cooling device is present in the lower slurry zone of the biosynthesis bath to aid in maintaining the proper growth temperature for the bacteria. The froth mixture removed from the froth zone of the biosynthesis bath at line 21 contains bacteria cells, unconverted hydrocarbons, and inorganic salts along with water.

The bacteria cells can be separated from the remainder of the froth mixture by conventional centrifuging or settling of the froth mixture directly after collection thereof; however, it is preferable to subject the froth mixture obtained at line 21 to a secondary froth flotation step in froth mixture concentrator 23 (FIG. 2) prior to separation of the bacteria from unconverted hydrocarbons, inorganic salts and water. For this purpose the froth mixture from reactor 7 is carried as a primary product stream from reactor 7 in line 21 to concentrator 23. A froth breaker (not shown) can be employed in line 21 between reactor 7 and concentrator 23 to break the froth and facilitate delivery thereof to the concentrator, which in effect is a secondary froth flotation cell. Concentrator 23 differs from froth flotation reactor 7 in that it need not serve as both a biosynthesis reactor vessel and a froth flotation cell. In fact very little biosynthesis usually takes place in concentrator 23 compared to reactor 7. Of course, it is within the purview of this invention to run a plural stage biosynthesis wherein concentrator 23 serves as a biosynthesis reactor vessel.

Air or other oxygen rich gas is delivered to concentrator 23 through delivery pipe 24 located in the bottom of the concentrator. The bubbling of air through the froth mixture aids the development of a lower secondary slurry zone and an upper secondary froth zone in concentrator 23. The concentrated froth mixture is removed as a product stream from the concentrator through froth effluent line 25 for centrifuging and drying. The secondary slurry effluent from the secondary slurry zone is recycled through conduit 26 to reactor 7. Air and other exhaust gases are vented from concentrator 23 through outlet line 27.

The bacteria cells in the concentrated froth mixture effluent can then be separated from the remaining unconverted hydrocarbons, inorganic salts and water by conventional settling or centrifuging followed if desired by drying, e.g., in conventional spray driers utilizing hot air to effect drying. Drying is not mandatory however, and the separated bacteria cells can be employed directly as a food supplement without drying.

Instead of using a single concentrator to effect concentration of the bacteria cells in the froth mixture withdrawn from reactor 7; two, three or even more such concentrators can be arranged in series. It has been discovered that the use of a single froth flotation concentrator cell 23 is capable of doubling the concentration of bacteria cells in the froth mixture withdrawn as a product stream from reactor 7.

It should be noted here that instead of centrifuge separation, other separation methods can be used such as filtration or settling with or without filter aids or coagulants. Of course, various drying procedures can be employed. In any event, it should be noted that the froth flotation biosynthesis procedure of this invention is extremely economic in that no complex separations and surfactant washings need be employed to remove hydrocarbons and by-products. It is noted that a number of other biosynthesis processes described in the literature as being commercial or potentially commercial suggest expensive surfactant washing, extracting and other procedures used on the product of these processes in order to obtain satisfactory animal feed material. Of course, if desired such additional procedures can be used to obtain a final product having extremely high protein content and virtually no impurities.

As noted previously, the purified hydrocarbon feed usually contains 90+ weight percent of $C_1$ to $C_{35}$ n-paraffins and up to 10 weight percent of n-olefins. When the inoculant microorganism is *Micrococcus cerificans*, a fairly high level of the $C_1$ to $C_{35}$ n-paraffins are $C_{11}$ to $C_{30}$ n-paraffins, e.g., from about 40 to 99+ weight percent of the $C_1$ to $C_{35}$ n-paraffins are comprised of $C_{11}$ to $C_{30}$ n-paraffins. The preferred purified hydrocarbon feed contains 95+ weight percent of $C_{11}$ to $C_{30}$ n-paraffins and up to 5 weight percent normal olefins containing from 11 to 30 carbon atoms. The $C_{11}$ to $C_{30}$ n-paraffin feeds can be petroleum feeds, e.g. gas oils boiling in the range of 190 to 400° C., and more preferably 190° to 320° C. and containing a substantial amount of $C_{11}$ to $C_{30}$ n-hydrocarbons. According to a preferred embodiment of this invention, it is necessary to employ a n-paraffinic hydrocarbon feed having a level of monocyclic aromatics of below 0.5 wt. percent, preferably below 0.1 wt. percent, and most preferably ranging from 100 p.p.m. to 0 p.p.m. This is essential because it has been discovered that aromatics are not attacked by the microorganisms, and when the economic separation procedures are used without such feed procedures are used without such feed purification, the product is detrimental to animals and humans. By detrimental it is meant that materials decrease the rate of growth of animals on these feeds. This is completely independent of the small amounts of polycyclic aromatics which are considered to be carcinogenic, and which are preferably kept from both the feed and the final product cells. These latter materials can be separated from the feed selectively by several processes and are in fact removed by the feed purification described below but it is surprising that the amount of monocyclic aromatics which constitute a significant part of the total aromatics, i.e., 20 to 50 percent thereof, are not utilized by the microorganisms employed herein and must also be removed in order to obtain the full benefits of this invention.

As mentioned hereinabove, the preferred process for purification of the hydrocarbon feed is a molecular sieve process. This process selectively adsorbs the straight chain hydrocarbons on the molecular sieve and thus purifies them substantially and completely from aromatics. A preferred method for carrying out this purification is described in U.S. Patent 2,070,542, and the disclosure of this patent is hereby incorporated by reference as a preferred technique for purifying the hydrocarbon feeds according to the present invention. The essence of this patent is the finding that by preloading of the molecular sieve by the displacing medium, preferably ammonia, and by introducing the displacing medium along with the hydrocarbon feed, the rate of adsorption is increased and subsequent desorption is greatly eased particularly with high molecular weight materials. It is also preferred to use an additional clean-up step as described in S.N. 223,078 filed Sept. 12, 1962, or S.N. 223,057 filed Sept. 12, 1962 and these specifications are hereby also incorporated by reference.

The present invention in its broadest aspects extends to the froth flotation biosynthesis of all microorganisms, including bacteria and yeasts, capable of growth on $C_1$ to $C_{35}$ hydrocarbon feeds, including: $C_1$ to $C_5$ gaseous paraffins, e.g., methane, ethane, propane and gases containing them; $C_6$ to $C_{10}$ light naphthas, viz., low boiling hydrocarbon oils of the $C_nH_{2n}+2$ series having a boiling point of 95° to 150° C. and petroleum fractions containing them; and $C_{11}$ to $C_{30}$ gas oils boiling in the range of 190 to 320° C. and petroleum fractions containing them. Each of the above feeds usually contains normal olefins in varying amounts.

When the microorganisms are grown on methane or other gaseous paraffin feeds, the preferred class of microorganism is Pseudomonadaceae, such as *Pseudomonas methanica*.

ratories of the present inventors leads to the conclusion that the designation "*Micrococcus cerificans*" may be inaccurate and that the said *Micrococcus cerificans* would be more correctly called an "Arthrobacter," and indeed does closely resemble "*Arthrobacter ureafaciens*." The following reasons are indicative of the above conclusion concerning the nomenclature of "*Micrococcus cerificans*" as more properly classifiable as an Arthrobacter.

| Micrococcus | *Micrococcus cerificans* | Arthrobacter |
|---|---|---|
| Always gram positive early in fermentation | Always gram neg | Gram neg. or variable. |
| Cells in irregular masses | Like Arthrobacter | Short filament formation. |
| Never change size | Like Arthrobacter | May occur with some rudimentary budding. |
| Never occur in a rod state | Like Arthrobacter | Larger than usual coccoid cells may appear at times. Large coccoid cells give rise to rod shaped cells. |
| Carbohydrates frequently fermented | Like Arthrobacter | Little or no acid from carbohydrates. |

When the froth flotation-biosynthesis is performed using a light naphtha feed, the preferred classes of microorganisms are Pseudomonadaceae and Arthrobacter, such as, *Pseudomonas fluorescens, Pseudomonas desmolyticum, Pseudomonas aeruginosa* and *Arthobacter globiforme*.

In the preferred embodiment, the froth flotation biosynthesis is conducted using a bacteria inoculant, esp., gram negative coccus bacteria; but yeasts can be employed, e.g. *Torulopsis magnolia* and *Candida albicans*.

While any aerobic, bacteria cells capable of assimilating normal $C_1$ to $C_{30}$ paraffinic hydrocarbons can be employed in the practice of this invention, preferred bacteria are as follows: *Micrococcus cerificans, Nocardia opaca* and *Nocardia rubra*. Especially preferred is *Micrococcus cerificans*, isolated and identified by Dr. R. E. Kallio et al., Journal of Bacteriology, vol. 78, No. 3, pp. 441–448 (September 1959). Cultures of this organism have been deposited in the American Type Culture Collection, 212 M Street, N.W. Washington 7, D.C. as No. 14,987. The full identification of this material is as follows:

Morphology: cells are small, spherical, tending to be elliptical in old cultures and in media high in nitrogen. Cells from defined media average 0.5 to 1.0 micron in diameter and from complex media 1.0 to 2.0 microns in diameter. Cells occur singly or in clumps. Non-motile, Metachromatic granules and sudanophilic granules are not observed.

Gram reaction: negative

Colonies on defined agar are small (1 mm.), circular, convex having entire edge. Colonies on nutrient agar are larger (2 to 5 mm.), raised mucoid, generally round.

Pigmentation: white, beige, yellow or tan variants occur.

Obligately aerobic: a wide variety of materials support growth: yeast extract, casein hydrolyzate, long-chain alcohols and acids, long-chain normal alkanes and olefins.

Carbohydrate fermentation: No carbohydrates are fermented except perhaps dextrose. Aerobically, few carbohydrates are assimilated. These include glucose, maltose, arabinose, rhamnose, sorbitol, dulcitol, and inulin. Aerobically, glucose is utilized with acid production. Gluconic acid has been identified.

Nitrate reduction: negative.

Gelatin liquefaction: generally negative. Slow liquefaction may occur in some strains.

Urea hydrolysis: yes
Catalase is produced
Hydrogen is not utilized
Optimum temperature is 30° C.
Optimum growth pH is 6.5 to 7.5
Source: Iowa soil
Habitat: soils Recent experimental information secured in the laboratories of the present inventors leads to the conclusion Preferred amounts of air used in culturing the bacteria is an amount in excess of 5 lbs. per pound of product. As noted previously, air is continuously introduced into the culture, preferably from the bottom of the reactor vessel through a sparger or other mechanical device suited to break up the air into fine bubbles. The volume of air introduced can be from 0.1 to 10, and preferably from 0.5 to 2.0, volumes per minute per volume of biosynthesis liquid.

As previously mentioned, the reactor can be stirred during biosynthesis by a paddle stirrer, propeller-type stirrer or other agitator means to completely distribute the oxygen throughout the reactant culture biosynthesis medium. For example paddle stirrers can be used having a horsepower rating of 1–20 per 1,000 gallons of reactant medium.

Nitrogen is essential to biosynthesis. The source of nitrogen can be an organic or inorganic nitrogen compound capable of releasing nitrogen in a form suitable for metabolic utilization by the microorganism being harvested. In the organic category, the following can be listed as exemplary nitrogen compounds: proteins, acid-hydrolyzed proteins, enzymedigested proteins, amino acids, yeast extract, asparagine, urea, etc. For reasons of economy it is preferable to employ inorganic nitrogen compounds, such as: ammonia, ammonium hydroxide, or salts thereof such as ammonium citrate, etc. A very convenient and satisfactory method of supplying nitrogen is to add ammonium hydroxide. In this way, the pH range of 5.0 to 8.5 and preferably 7.0 and the requisite nitrogen intake which is supplied to the system can be readily controlled simultaneously. For this purpose, ammonia gas also can be bubbled directly into the biosynthesis bath which contains water. The ammonium hydroxide is supplied to the biosynthesis bath in amounts of 0.08 to 0.20, preferably 0.1 to 0.15 gram of nitrogen per gram of dried bacteria cells produced. This amounts to from 0.01 to 1.0 wt. percent and preferably from 0.1 to 0.15 wt. percent nitrogen based on total biosynthesis bath.

In addition to the energy and nitrogen sources, it is necessary to supply requisite amounts of selected mineral nutrients in the feed medium in order to maximize selectivity, viz., the conversion of hydrocarbons to bacteria cells. Thus, potassium, sulfur and phosphorus are required. These necessary materials can be supplied in the form of their salts, and preferably their water-soluble salts. For example, the potassium can be supplied as potassium chloride, phosphate, sulfate, citrate, acetate, nitrate, etc. Sulfur and phosphorus are usually supplied in the form of sulfates, and phosphates, respectively, such as alkali metal or ammonium sulfates and phosphates. The usually employed and preferred amounts of essential ions used in the froth flotation biosynthesis procedures of this invention to maximize selectivity are as follows:

| Salt | Ion | Usually employed weight percent ion supplied based on aqueous slurry | Preferred weight percent ion supplied based on aqueous slurry |
|---|---|---|---|
| $CaCl_2$ | $Ca^{++}$ | 0.001 to 0.10 | 0.001 to 0.05. |
| $FeSO_4 \cdot 7H_2O$ | $Fe^{++}$ | 0.0001 to 0.10 | 0.0002 to 0.007. |
| $KCl$ | $K^+$ | 0.01 to 0.20 | 0.03 to 0.15. |
| $MgSO_4$ | $Mg^{++}$ | 0.001 to 0.10 | 0.001 to 0.05. |
| $MnSO_4$ | $Mn^{++}$ | 0.001 to 0.05 | 0.0002 to 0.01. |
| $Na_2SO_4$, $NaCl$ | $Na^+$ | 0.001 to 0.1 | 0.02 to 0.06. |
| $H_3PO_4$ | $PO_4^=$ | 0.1 to 1.0 | 0.1 to 0.5. |
| (as above) | $SO_4^=$ | 0.001 to 0.1 | 0.03 to 0.06. |
| $NH_4Cl$, $NH_4OH$ | $NH_4^+$ | 0.01 to 1.0 | 0.05 to 0.15. |
| (as above) | $Cl^-$ | 0.001 to 0.1 | 0.01 to 0.05. |

In all the above, the essential mineral ions can be less preferably supplied in the form of other salts in amounts stoichiometrically the same (by calculation) to yield the ion concentrations as indicated above for the preferred salts.

The temperature of the culture during biosynthesis can be varied from about 20 to 55° C. When gram negative coccus bacteria, esp. *Micrococcus cerificans* are grown on $C_{11}$ to $C_{30}$ n-paraffins, the culture temperature is maintained at from 20 to 45° C., preferably 28 to 38° C. In maintaining proper temperature levels it is usually necessary to heat the system during early stages of start-up whereas as the culture proceeds it will be observed that heat is generated in the culture and hence cooling is necessary to maintain the desired temperature. The cooling can be effected economically by utilizing cooling coils in the froth flotation biosynthesis reactor vessel (as shown in the drawing) or by recycling a given portion of the aqueous slurry zone of the biosynthesis bath through a cooler.

The amount of hydrocarbon supplied to the biosynthesis bath based on aqueous salt medium supplied including ammonium hydroxide (viz., on an "as fed" basis) can range from 0.5 to 5 weight percent, usually 0.5 to 2.0 wt. percent and preferably 1.0 to 1.5 wt. percent when straight air is employed as a source of oxygen. When using oxygen-enriched gases for example, air having 70+ wt. percent oxygen; the preferred amount of hydrocarbon supplied based on aqueous salt medium supplied (including ammonium hydroxide) is 2.0 to 5.0 wt. percent. The weight percent of $C_{11}$ to $C_{30}$ n-hydrocarbons actually existing in the slurry zone of the biosynthesis bath during growth can range from 0.01 to 1.0 weight percent usually ranges from 0.01 to 0.1, and preferably ranges from 0.01 to 0.05 weight percent (based on total biosynthesis bath), especially when the inoculant bacteria is *Micrococcus cerificans*.

The residence time of the cells in the biosynthesis bath is much less than the residence time of the feed materials therein; and, usually in accordance with this invention the residence time of feed materials (and other non-cell biosynthesis bath contents) is 5 to 20 times as large as cell residence time. The term residence time as used herein means the reactor volume divided by the average through-put rate for each component.

Usually the mean residence time of the feed materials ranges from 5 to 60 hours and preferably from 10 to 20 hours, whereas the mean cell residence time ranges from 0.5 to 4 hours and preferably from 1 to 3 hours. The residence time of each component of the biosynthesis bath is a function of its concentration ratio, viz., the weight percent of a component in the froth divided by its weight percent in the slurry. The concentration ratio of a given component is inversely proportional to its residence time.

The present invention attains the benefits of a cyclic process without requiring the additional separation and recycle equipment associated therewith. In other words according to the process of this invention, the product is removed preferentially as compared to the reactants. This advantageous differential between cell residence time and feed materials residence time is unexpected because of the highly heterogeneous system involved and the unpredictable nature of bacteria as regards biosynthesis, viz., product cell concentration compared to by-product chemicals concentration and reactant concentrations.

The employment of the preferred cell and feed residence times, respectively, not only improves selectivity to product cells, but also reduces autolysis (cannibalism), oxygen requirements and feed costs.

While the process of this invention does not require recycle of the aqueous slurry to achieve selective concentration of cells, recycle of the unutilized feed components of the aqueous slurry can be employed to achieve further economies in the basic process.

The froth flotation-biosynthesis procedures of this invention should be conducted in the absence of surfactants as these materials not only serve to inhibit the establishment and maintenance of proper cell and hydrocarbon concentrations in the froth zone during biosynthesis, but also tend to adversely affect bacterial growth and multiplication with some organic cation surfactants having a poisonous effect.

In order to insure obtaining the desired high bacterial cell concentrations in the froth zone of the biosynthesis bath, it is preferable to employ in the slurry zone of the biosynthesis bath small amounts, e.g. from 0.5 to 2.0 percent, of a non-toxic inorganic salt containing a mono-, di- or trivalent cation which is not toxic to growth of the chosen bacteria in the salt concentrations used. Sodium salts constitute a preferred class of inorganic salts, especially sodium salts of mineral acids. Sodium chloride has been found to yield excellent results in that it aids preferential concentration of bacteria cells, especially *Micrococcus cerificans* bacteria cells, in the froth zone. In place of, or in addition to sodium chloride, the following sodium containing inorganic salts can less preferably be used: sodium halides, sodium sulfate, sodium phosphate, sodium ammonium phosphate, sodium citrate, sodium ferrite, sodium manganate, sodium nitrate, etc.

In order to attain high *Micrococcus cerificans* bacteria cell concentrations in the froth zone, it is preferable to employ at least 0.5 wt. percent sodium salt, preferably as sodium chloride, in the biosynthesis bath and biosynthesis bath feed. Usually, in order to insure optimum froth flotation concentration selectivity of *Micrococcus serificans* bacteria cells in the froth zone of the biosynthesis bath, the sodium chloride content of the biosynthesis bath is maintained between 0.5 and 2.0 wt. percent (based on total biosynthesis bath materials), and preferably between 0.5 and 1.0 percent by weight.

A small extent of mechanical agitation in the form of stirring of the biosynthesis bath is helpful in order to insure proper contact of the bacteria cells with the hydrocarbon, and aqueous growth medium containing the necessary mineral nutrients for bacterial growth and multiplication. Also agitation of the biosynthesis bath helps to cut down on hydrocarbon concentration in the froth zone. However, the agitation should not be so vigorous as to interfere with the froth flotation by breaking the froth. In fact, excellent bacteria cell concentrations of grown cells have been achieved in the froth zone without stirring. The moderate agitation caused by bubbling air in the form of fine bubbles uniformly throughout the slurry zone provides sufficient agitation for froth flotation. It has also been discovered that excessively high air introduction rates into the biosynthesis bath tended to destroy the froth due to turbulence in the froth itself. However, if insufficient air is bubbled into the biosynthesis bath; there results insufficient aeration to insure proper bacteria growth in the slurry zone and froth flotation of bacteria cells. With regard to the rate of air introduction into the biosynthesis bath, it is important to deliver the air into the biosynthesis bath in a manner sufficient to insure an intermediate or quasilaminar flow of air upwards through the slurry zone to establish proper froth flotation for overhead product removal. For this purpose, the air delivery rate should range from 10 to 100 cubic centimeters/minute/square centimeter of reactor cross section, usually ranges from 15 to 80 cc./min./cm.$^2$ and preferably ranges from 20 to 40 cc./min./cm.$^2$. It has been discovered that by employing: (1) the preferred n-paraffinic hydrocarbons and hydrocarbon feed content and rates, (2) the preferred inoculant bacteria, (3) the preferred oxygen contents and feed rates, (4) the preferred residence times, (5) the preferred amounts of sodium salt (or salts) and (6) the preferred inorganic nutrient salts in the preferred weight concentrations; bacteria cell concentrations of 3 to 6 percent by weight and even higher can be achieved readily in the froth mixture removed from the froth zone of the biosynthesis reactor. Concentration of this froth mixture by a froth flotation step (or steps) prior to separation can yield bacteria cell weight concentrations ranging from 6 to 12 percent and even higher in the concentrated froth mixture removed as a product stream from the froth concentrators (or concentrations).

When it is remembered that the aqueous slurry product stream taken from conventional biosynthesis procedures (wherein bacteria cells are grown on hydrocarbon feeds) usually has a bacteria cell weight concentration of approximately one percent, the meritorious contributions of this invention are immediately apparent.

Analyses of the cells from the froth mixture removed from the froth zone of the froth flotation-biosynthesis reactor show that these cells contain less ash, viz., inorganic salts, than are present in the cells of the lower slurry zone of the same biosynthesis bath. For example, upon analysis of a typical froth mixture, an ash content of approximately 9.0 wt. percent (based on dried froth mixture) was found. Analysis for the ash content of the lower slurry zone of the same biosynthesis bath yielded approximately 13.0 wt. percent ash. Thus, froth flotation biosynthesis of bacteria cells according to this invention offers another advantage, viz., reduced content of inorganic salts in the dried product bacteria. It is desirable to minimize the concentration of inorganic salts in the product dried bacteria in order that the salts can be retained in the aqueous slurry zone where they can be more effectively employed for bacteria growth. Moreover, the presence of inorganic salts in the product dried bacteria detracts somewhat from its protein food value. Hence, it will be realized that any diminution in the content of inorganic salts in the product bacteria cells constitutes an upgrading in their food value and protein content.

Another curious and advantageous phenomenon was observed by subjecting typical samples of bacteria cells removed from the froth zone and bacteria cells removed from the aqueous slurry zone of the same biosynthesis bath to chemical analysis. On the average, the froth bacteria cells contained approximately 5% more protein and 6% more sulfur than the bacteria cells of the aqueous slurry zone.

Whether the froth flotation biosynthesis is conducted as a batch or continuous operation, it is important to observe the above indicated process and compositional parameters in order to achieve the full measure of benefits attainable by this invention.

The present invention will be more clearly understood from a consideration of the specific examples which follow.

*Example I.—Batch froth flotation without subsequent froth flotation concentration*

*Micrococcus cerificans* were grown on a $C_8$ to $C_{19}$ n-paraffin hydrocarbon containing no more than 40 p.p.m. aromatics. This feed mixture was obtained by passing San Joaquin virgin distillate (450–550° Fahrenheit vapor temperature) through a 5A molecular sieve and then through a 13X molecular sieve. Chromatographic analysis of a typical feed hydrocarbon showed the following concentrations:

| Carbon number: | Weight percent |
|---|---|
| 8 | 0.1 |
| 9 | 0.4 |
| 10 | 1.3 |
| 11 | 3.1 |
| 12 | 5.5 |
| 13 | 9.9 |
| 14 | 18.7 |
| 15 | 25.7 |
| 16 | 22.3 |
| 17 | 10.9 |
| 18 | 2.0 |
| 19 | 0.1 |

The composition of the inorganic salts solution was as follows:

| Mineral salt: | Feed level, wt. |
|---|---|
| $CaCl_2$ | 0.010 |
| $FeSO_4 \cdot 7H_2O$ | 0.0040 |
| KCl | 0.050 |
| $MgSO_4$ | 0.020 |
| $MnSO_4$ | 0.0040 |
| $Na_2SO_4$ | 0.050 |
| $NH_4Cl$ | 0.10 |
| 85% $H_3PO_4$ | 0.15 |
| Water (Elizabethtown, N.J., supply) | Remainder |

The growth conditions established prior to feeding the slurry to the batch flotation tank were as follows:

| | |
|---|---|
| Air rate | 22 cc./min./cm.$^2$ of reactor cross sectional area. |
| $C_8$–$C_{19}$ hydrocarbon feed rate | 20 g./hr. |
| Mineral salts feed rate | 1960 g./hr. |
| 7.0 N ammonium hydroxide feed rate | 30 g./hr. |
| pH controlled by using $NH_4OH$ addition | 7.0. |
| Temperature | 34° C. (±1° C.). |
| Agitation | 1000 r.p.m. |

Four liters of approximately 1.0% by weight (dry basis) solids aqueous slurry produced as outlined above were transferred to a froth-flotation device (having a quiescent side zone) of the type shown in FIGURE 1. The vessel, having a volume of 7500 cubic centimeters, was charged with an aqueous slurry containing approximately 1.0 weight percent *Micrococcus cerificans*. Sufficient air was bubbled through the aqueous slurry to produce a heavy froth zone. No stirring was used after transfer of the slurry to the forth flotation device, nor was any other form of agitation employed except that caused by the air. The experiment was conducted at ambient temperatures, viz., 20 to 25° C. The pH was maintained essentially neutral, viz., pH=approximately 7, throughout the run.

Between 5 and 10 minutes after frothing started, representative samples were taken from the froth and slurry. These samples analyzed for bacteria cell and hydrocarbon concentration. The results are shown below.

| Component: | Concentration ratio (Froth conc./slurry conc.) |
|---|---|
| Cells | 2.24 |
| Hydrocarbon | 1.41 |
| Air rate (cc./min./cm.$^2$ of reactor cross section) | 75 |
| Slurry concentration at start (Wt. percent solids, dry basis) | 0.95 |
| Agitation (r.p.m.) | None |

The bacteria were concentrated 2.24 to 1.0 in the froth as compared to the slurry, thus demonstrating the feasibility of froth flotation to yield bacteria concentrations substantially exceeding those obtainable in conventional biosynthesis baths (where the cell concentrations average approximately 1 weight percent).

*Example 2.—Continuous froth flotation biosynthesis without subsequent froth flotation concentration*

Four liters of 1.0% slurry produced as outlined in Example 1 were transferred to a special froth-flotation reactor as shown in FIGURE 1. The vessel had a volume of 7500 cubic centimeters and a special froth zone chamber on one side.

Sufficient air was continuously bubbled through the aqueous inoculant slurry to satisfy the bacteria oxygen demand. The composition of hydrocarbon and inorganic salt feeds was the same as in Example 1. The air feed rate was 25 cubic centimeters per minute per square centimeter of reactor cross sectional area.

The volumetric feed rate at which the inorganic salts medium is fed must be proportionately concentrated during various stages of any given continuous campaign for froth-flotation biosynthesis since the product is preferentially concentrated in the froth while the salts remain behind in the slurry. For example, when the concentration ratio of froth cells to slurry cells is 3:1 then the inorganic salts feed is concentrated approximately 2 to 3:1. Also the inorganic salts plus hydrocarbon plus ammonium hydroxide volumetric inflows are maintained equal to the volume of condensed foam withdrawn from the froth-flotation biosynthesis reactor. The above conditions yielded the following steady-state concentrations in the slurry.

Component: Weight percent
*Micrococcus cerificans* cells _____ 1.0 (±0.1)
Hydrocarbon _____ 0.06 (±0.05)
$CaCl_2$ _____ 0.005
$FeSO_4 \cdot 7H_2O$ _____ 0.0020
KCl _____ 0.045
$MgSO_4$ _____ 0.010
$MnSO_4$ _____ 0.001
$NH_4Cl$ _____ 0.050
$H_3PO_4$ (85%) _____ 0.050

An agitation level of at least 1000 r.p.m. was employed throughout this run. Shortly after start-up, a heavy froth zone appeared as the upper portion of the biosynthesis bath, above the slurry. The froth was collected with care being taken to remove only that amount of cells, in the form of froth, which were being steadily produced in the slurry plus froth growth zones. Off gas $CO_2$ concentration was used as a control (by maintaining about 4% carbon dioxide in the off gas, the proper biosynthesis rate was assured). Thus, continuous withdrawal of cells via the froth removal was made equal to the production rate in the biosynthesis reactor. When a steady state was reached (1–6 hours after start-up) samples were taken and analyzed for hydrocarbon and cells. Several runs were made and the results are shown below:

|  | Froth | Slurry | Concentration ratio (froth/slurry) |
|---|---|---|---|
| Run 1: |  |  |  |
| Wt. percent bacterial cells | 2.46 | 1.25 | 1.97:1 |
| Wt. percent hydrocarbon | 0.77 | 0.41 | 1.88:1 |
| Run 2: |  |  |  |
| Wt. percent bacterial cells | 3.36 | 0.53 | 6.34:1 |
| Wt. percent hydrocarbon | 0.14 | 0.20 | 0.7:1 |
| Run 3: |  |  |  |
| Wt. percent bacterial cells | 2.48 | 1.84 | 1.35:1 |
| Wt. percent hydrocarbon | 0.069 | 0.041 | 1.68:1 |

The cell concentration ratios of froth cells with respect to slurry cells ranged from 1.3 to 6.3:1 thus demonstrating the feasibility of using froth flotation biosynthesis to yield bacteria cell concentrations substantially exceeding those obtainable in conventional biosynthesis where the bacteria cells are removed from slurries averaging approximately 1 weight percent.

*Example 3.—Effect of $Na^+$ on cell concentration selectivity (batch flotation)*

A series of single stage batch froth flotation biosyntheses were conducted as in Example 1 but varying the concentration of sodium salt in the slurry to determine its effect on the concentration of bacteria cells in the froth zone in relation to the concentration of hydrocarbon therein.

The results of using several levels of sodium chloride are outlined below:

| Run No. | NaCl content (wt. percent) | Concentration ratios | | Cell content of slurry (wt. percent) |
|---|---|---|---|---|
|  |  | Percent cells in froth/percent cells in slurry | Percent hydrocarbon in froth/percent hydrocarbon in slurry |  |
| 1 | 0.0 | 3.67 | 7.8 | 1.06 |
| 2 | 0.5 | 5.63 | 7.4 | 1.06 |
| 3 | 1.0 | 4.40 | 5.0 | 1.06 |
| 4 | 2.0 | 4.39 | 5.6 | 1.06 |

Air rate = 23–38 cc./min./cm.²

This data clearly shows the contributory effect of NaCl in obtaining high bacterial concentration in the froth zone while avoiding detrimental concentrations of hydrocarbons therein.

*Example 4.—Froth flotation biosynthesis with subsequent froth flotation concentration*

Experiments were carried out as in Examples 1, 2 and 3 with the effect of using two stages of flotation being studied. The results:

| Stage | Cells in slurry, weight percent | Concentration ratios | | Air Rate, cc./min./cm.² |
|---|---|---|---|---|
|  |  | Froth cells/slurry cells | Froth/hydrocarbon/slurry hydrocarbon |  |
| 1 | 1.47 | 2.1 | 1.9 | 36 |
| 2 | 3.06 | 2.0 | 1.0 | 16 |
| Product | 6.12 |  |  |  |

Agitation—Stage 1 = 1,500 r.p.m., Stage 2 = 0.
Additive—0.2 wt. percent NaCl.

show how a froth-flotation biosynthesis in combination with a second stage flotation step and 0.2% NaCl can increase the bacteria cell concentration in the product stream. The weight percent of cells in the aqueous slurry of the froth flotation biosynthesis bath was 1.47% compared to 6.12% in the froth coming from second stage for an overall cell concentration ratio of 4.2:1. At the same time the hydrocarbon is concentrated only 1.9:1 thus conserving the hydrocarbon feed in the growth reactor.

*Example 5.—Effect of air rate on concentration ratio of cells*

An experiment was conducted, as in Example 1, in which the air rate was varied. It will be apparent from the data below that increasing the air rate caused a drop in the cell concentration ratio.

| Gas rate, cc./min./cm.² | Weight percent cells in slurry (dry basis) | Cell concentration ratio (froth cells/slurry cells) |
|---|---|---|
| 23 | 1.11 | 4.24 |
| 55 | 1.05 | 3.90 |
| 75 | 0.95 | 2.42 |

*Example 6.—Effect of agitation in batch flotation without use of a quiescent zone*

According to the most preferred embodiment of the invention, the froth-flotation biosynthesis reactor is provided with a side chamber, which is a relative quiescent zone. The advantage of providing a quiet or non-mixed zone is illustrated by the following data secured in runs not employing a quiescent zone side chamber.

| Run No. | Agitation, r.p.m. | Concentration ratios | |
|---|---|---|---|
| | | Froth cells/slurry cells | Froth hydrocarbon/slurry hydrocarbon |
| 1 | 0 | 2.42 | 0.54 |
| 2 | 1,500 | 1.42 | 0.55 |

Air rate=75 cc./min./cm.$^2$.
Slurry cells, wt. percent=0.95.

This data indicates that agitation has a detrimental effect on the cell concentration ratio. However, the weight percent of cells present in the froth still exceeds that of the slurry. With the use of a quiescent side chamber (as mentioned above), higher cell concentration ratios can be attained. For example, a cell concentration ratio of 2.1:1 was attained in Stage 1 of Example 4 using the reactor of FIGURE 1 having a quiescent side zone even though agitation was employed.

The bacteria cells produced in accordance with this invention are useful as a high protein food or food supplement for animals and/or humans to provide a source of animal protein including many of the essential amino acids.

A typical sample of *Micrococcus cerificans* cells produced in accordance with this invention when analyzed for protein content and amino acid distribution yielded the following results.

Protein content=72 percent (calculated from nitrogen content of 11.5 percent, determined by Kjeldahl method, by multiplying nitrogen content by constant of 6.25).

*Component analysis (chromatographic analysis)*

| Amino acid: | Percent of protein |
|---|---|
| Arginine | 4.51 |
| Glycine | 3.36 |
| Histidine | 1.85 |
| Isoleucine | 4.08 |
| Leucine | 6.57 |
| Lysine | 5.70 |
| Methionine | 2.13 |
| Cystine | 1.11 |
| Threonine | 4.50 |
| Phenylalanine | 3.39 |
| Tyrosine | 2.83 |
| Tryptophan [1] | 0.92 |
| Valine | 5.12 |
| Glutamic acid | 9.85 |
| Aspartic acid | 8.92 |
| Serine | 3.30 |
| Proline | 3.04 |
| Alanine | 6.62 |
| Ornithine | 1.08 |

[1] Done by microbiological assay.

While the foregoing examples have illustrated this invention in great detail, it should be realized that the present invention in its broadest aspects is not necessarily limited to the specific materials, temperatures, etc., as set forth therein.

What is claimed is:

1. A process for preparing a high protein food which comprises:
   (a) providing an inoculant of aerobic microorganism cells, water and oxygen;
   (b) supplying to said inoculant a feed mixture comprised of
      (1) $C_1$ to $C_{35}$ n-hydrocarbons containing less than 0.1 weight percent aromatics in an aqueous growth medium containing in its essential components water, a nitrogen compound, a phosphorus compound and water-soluble inorganic salts of sodium, potassium, magnesium, calcium, iron and manganese, and
      (2) An oxygen containing gas to form a biosynthesis bath;
   (c) establishing and maintaining in said biosynthesis bath an upper froth zone wherein the weight ratio of froth bacteria to froth hydrocarbons exceeds 1.0 to 1, and a lower slurry zone;
   (d) establishing and maintaining in said biosynthesis bath a weight ratio of bacteria cells in said froth to bacteria cells in said slurry in excess of 1.0 to 1;
   (e) establishing and maintaining in said biosynthesis bath a weight ratio of hydrocarbons in said froth to hydrocarbons in said slurry of less than 2 to 1;
   (f) removing a froth mixture of bacteria cells, aqueous growth medium and unconverted hydrocarbons from said froth zone;
   (g) separating bacteria cells from the remainder of said froth mixture, and
   (h) drying the separated bacteria cells to obtain directly a high protein food.

2. A process according to claim 1 wherein said remainder of said froth mixture is recycled back to the slurry zone of said biosynthesis bath.

3. A process according to claim 1 wherein said froth mixture is concentrated by froth flotation prior to separation of the bacteria cells therefrom.

4. A process according to claim 1 wherein the pH of said biosynthesis bath ranges from 6 to 8.

5. A process according to claim 1 wherein said aerobic, microorganism cells are gram negative coccus bacteria cells.

6. A process according to claim 1 wherein the slurry zone hydrocarbon weight concentration ranges from 0.01 to 1.0 weight percent.

7. A process for preparing a high protein food which comprises:
   (a) providing an inoculant of *Micrococcus cerificans* bacteria cells, water and oxygen;
   (b) continuously supplying to said inoculant a feed mixture comprised of
      (1) $C_1$ to $C_{35}$ n-paraffinic hydrocarbons containing less than 0.1 weight percent aromatics in an aqueous growth medium containing in its essential components water, a nitrogen compound, a phosphorus compound and water soluble inorganic salts of sodium, potassium, manganese, calcium, iron and magnesium, and
      (2) air to form a biosynthesis bath;
   (c) establishing and continuously maintaining in said biosynthesis bath an upper froth zone wherein the weight ratio of froth bacteria to froth hydrocarbons exceeds 1.0 to 1; and a lower slurry zone containing from 0.01 to 1.0 weight percent $C_1$ to $C_{35}$ n-paraffinic hydrocarbons;
   (d) establishing and maintaining in said biosynthesis bath a weight ratio of bacteria cells in said froth to bacteria cells in said slurry in excess of 1.5 to 1;
   (e) continuously removing a froth mixture of bacteria cells, aqueous growth medium and unconverted hydrocarbons from said froth zone;
   (f) separating bacteria cells from the remainder of said froth mixture, and
   (g) drying the separated bacteria cells to obtain directly a high protein food.

8. A process according to claim 7 wherein said sodium salt is present in a weight concentration ranging from 0.5 to 2.0 percent based on total biosynthesis bath components in said slurry.

9. A process according to claim 7 wherein the weight concentration of inorganic salts in said froth is less than that in said slurry.

10. A process according to claim 7 wherein the bacteria cells of said froth mixture are concentrated by froth flotation after removal from the froth zone of said biosynthesis bath but prior to separation from the remainder of the components of said froth mixture.

11. A process according to claim 7 wherein said remainder of said froth mixture is recycled back to the slurry zone of said biosynthesis bath.

12. A process according to claim 7 wherein the weight concentration of bacteria cells removed from said froth zone, expressed as a percentage based on froth mixture removed, exceeds two percent.

13. A process according to claim 10 wherein the weight concentration of bacteria cells after said concentration but prior to said separation from the remainder of the components of the concentrated froth mixture, expressed as a percentage based on concentrated froth mixture removed, exceeds four percent.

14. A process according to claim 7 wherein the residence time of feed materials in said biosynthesis bath ranges from about 5 to 60 hours.

15. A process according to claim 7 wherein the residence time of bacteria cells in said biosynthesis bath ranges from about 0.5 to about 4 hours.

16. A process according to claim 7 wherein said biosynthesis bath aqueous slurry in its essential inorganic components is comprised of the following in terms of weight percent of ion supplied based on aqueous slurry; 0.1 to 1.0 percent phosphate; 0.01 to 1.0 percent ammonium; 0.001 to 0.1 percent sodium; 0.01 to 0.2 percent potassium; 0.001 to 0.1 percent magnesium; 0.001 to 0.1 percent calcium salt; 0.0001 to 0.1 percent iron; 0.001 to 0.05 percent manganese; 0.001 to 0.1 percent sulfate and 0.001 to 0.1 chloride.

17. A process according to claim 7 wherein the temperature of said biosynthesis bath ranges from about 20 to 55° C.

18. A process according to claim 7 wherein said ammonium is supplied as ammonium hydroxide.

19. A process according to claim 7 wherein said phosphate is supplied as phosphoric acid.

No references cited.

A. LOUIS MONACELL, *Primary Examiner.*

H. H. KLARE, *Assistant Examiner.*